Figure 2:
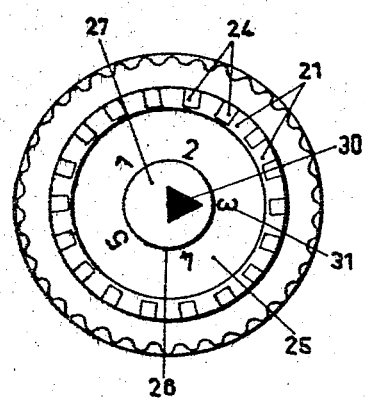

March 21, 1967 H. T. NIELSEN ETAL 3,309,926
THERMOSTATIC VALVE REGULATOR

Filed July 6, 1964 2 Sheets-Sheet 2

United States Patent Office 3,309,926
Patented Mar. 21, 1967

3,309,926
THERMOSTATIC VALVE REGULATOR
Helmar Trost Nielsen, Nordborg, and Knud Aage Hansen, Sonderborg, Denmark, assignors to Danfoss A/S, Nordborg, Denmark, a company of Denmark
Filed July 6, 1964, Ser. No. 380,466
Claims priority, application Germany, July 13, 1963, D 41,989
5 Claims. (Cl. 73—368.7)

This invention relates generally to automatic thermostatically controlled valves and more particularly to a new and improved automatic thermostatic regulator for thermostatically controlled valves.

It is a principal object of the present invention to provide a new and improved automatic thermostatic regulator of the type employing a temperature-responsive actuator containing a temperature-responsive sensing fluid.

A feature of the invention is the provision of a regulator construction in which a temperature setting or control spring cooperates with an abutment movable in a direction axially of the longitudinal axis of the regulator for holding in axially-assembled relationship the actuator mechanism and a cylindrical element disposed circumferentially thereof constituting the regulator housing which is rotatably mounted as a control element for variably adjusting and setting the operating temperatures or settings of the regulator.

The regulator construction according to the invention uses the temperature adjustment or control spring for holding the principal components of the regulator in axially-assembled relationship without the need of complex assembly-retaining means and complex stops that can be over-stressed and even broken in the event that the regulator is over-controlled manually in setting the temperature settings thereof.

Structure is provided on the actuator housing or casing comprising a stationary stop cooperative with one or more angularly movable stops on the cylindrical housing or casing for limiting the angular travel of the cylindrical control element, thereby to ensure that the spring in the actuator is kept in tension at all times sufficient to maintain the actuator and cylindrical outer housing or control element of the regulator in axially-assembled relationship. Furthermore, by limiting the relative angular movement of the actuator and cylindrical outer housing element there is no possibility of damage to the temperature-responsive elements within the actuator either with respect to allowing a contractible and expansible element in the actuator to be over-stressed by over-compression or over-stressed by allowing over-expansion thereof and/or over-extension thereof.

Another feature of the invention is that the adjustment member constituting the cylindrical element forming the outermost housing of the regulator functions both as an adjustment element and also as a safety device. Furthermore, the cylindrical adjustment or control element can be upon initial assembly variably positioned angularly relative to the actuator to variably define the outer limits of the control range of the regulator in which the angular positions or settings of the adjustment element define temperature settings within the outermost initial temperature limits established by initial relative positions of the cylindrical element and the stationary actuator.

Still another feature of the present invention is the construction of the outer housing of the regulator as an adjustable element provided with sufficient openings therein to allow the actuator element internally thereof to operate for sensing ambient temperatures directly and immediately in the vicinity of the regulator and valve being controlled thereby.

Furthermore, the construction of the cylindrical adjustment element as the outer housing permits the use of a relatively large scale for the temperature settings to be indicated thereon along with a large datum or index relative to which adjustment is made. The scale is readily viewable and is parallax-free when read.

Another feature of the invention is a new and novel construction by which the actuator element and the housing or adjustment element of the regulator are operably connected through a mechanism constituting the axially movable abutment for the control spring by which the temperature settings are set. Furthermore, the use of a relatively large diameter control element such as the traveling abutment in conjunction with a relatively large diameter housing constituting the control element or "knob" of the regulator permits optimization of control and accuracy of control by virtue of a relatively wide range of settings of temperature settable on the control spring due to the relatively large diameters of the control elements. These control members permit a substantial change of compression in the control spring by a relatively small angular relative movement of the control elements. The entire range of settings can be made in less than one revolution of the regulator cylindrical having functioning as the control or adjustment "knob."

An additional feature of the invention is the provision of a simple structure for relatively assembling and holding the major components of the regulator, constituting the actuator and the cylindrical outer adjustment housing, radially in an easy manner.

Figure 1:
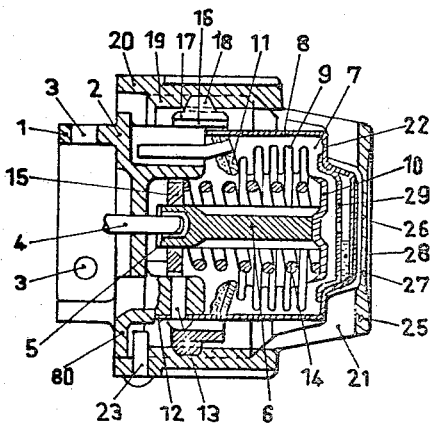
Figure 4:
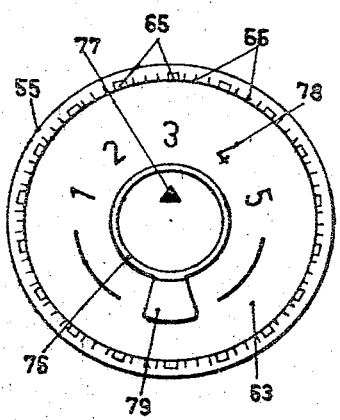
Figure 3:
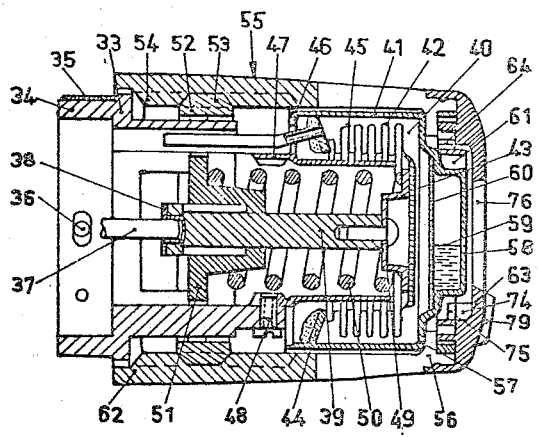
Figure 5:
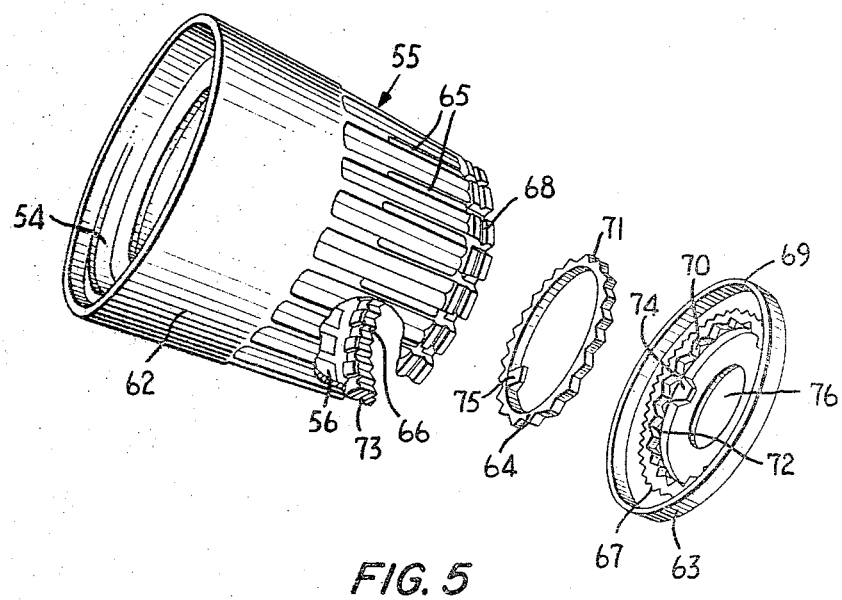

Other features and advantages of the automatic thermostatic regulator in accordance with the present invention will be better understood as described in the following specification and appended claims, in conjunction with the drawings in which:

FIG. 1 is an elevational view in section of a thermostatic regulator according to the invention;
FIG. 2 is a plan or end view of the regulator in FIG. 1 as viewed from the right-hand side of the sheet;
FIG. 3 is an elevation section view of a second embodiment of a thermostatic regulator according to the invention;
FIG. 4 is a plan view of the regulator in FIG. 3 viewed similarly as FIG. 1 is viewed in FIG. 2; and
FIG. 5 is an exploded view of control elements in the regulator illustrated in FIG. 3.

According to the drawing, FIGS. 1 and 2, a regulator according to the invention comprises an annular part 1 of a body portion 2 is provided with angularly spaced openings 3 for mounting the regulator permanently or semi-permanently, in a removable condition, on a valve body of a valve, not shown. It being understood that the regulator according to the invention is mounted on a valve to be automatically controlled in the manner in which a valve bonnet is mounted on non-automatic valves. The controlled valve may have a seat and a valve for opening and closing the valve to control flow therethrough under control of the regulator.

The regulator is operably connected to the valve for actuating it through an actuatable operating element of the valve, for example a valve stem 4 shown fragmentarily in FIG. 1. While the embodiment illustrated in FIG. 1 and that in FIG. 3 will be described with respect to a valve in which the actuating or operating element is a valve stem for opening and closing the valve, it will be understood by those skilled in the art that the regulator can be used on valves in which actuation to the corresponding operating positions or conditions of the valve is accomplished through means other than a valve stem which is operated axially. Thus, for example, the regulator elements while actuating the valve stem 4 axially could be connected to an operating element, not shown, in a valve in which the operating element is driven rotationally in response to the control movements of the regulator mechanism hereinafter described. The mounting of the regulator can be suitably modified to mount the valve on different types of valves.

In the first embodiment of the invention illustrated the valve stem 4 extends axially through the body portion 2 and is received in a recess 5 of an element or stem 6 for axial movement of the valve stem 4 and constituting an actuating element of an actuator means 7 comprising a housing or casing 8 internally of which is housed a contractible and expansible means comprising a bellows 9 provided with an end cap or closure 10. An inner annular flange 11 is provided internally of the housing 8. The bellows is connected to this flange in a fluid-tight connection to define a fluid-containing chamber between the casing and bellows for reasons explained later herein. The housing 8 is provided with a lower extension 12 disposed circumferentially of an annular part of the regulator body portion 2 and secured thereto, for example by pins 13.

A control spring 14 is provided internally of the bellows 9 and is disposed circumferentially of the actuator element 6 and bears on the end closure 10 of the bellows and against a traveling abutment 15 provided with radial arms 16 extending through apertures, in the body portion 2, which allow angular travel of these arms. The arms support radial extensions or rim portions 17 of the abutment 15 provided with an external thread 18 threaded with a complimentary inner thread 19 if a one-piece cylindrical adjustment element 20 constituting the outer housing element of the regulator and functioning as a rotatable control element or "knob" for variably setting the temperature to be maintained by the regulator.

The cylindrical element 20 is provided with a tubular lower portion on which the thread 19 is formed and angularly spaced axial ribs 21 having a shoulder extending radially inwardly defining a transverse portion of the adjustment element transversely of the actuator means and engaging a top annular surface 22 of the actuator housing or casing 8. The spring 14 biases the valve stem 4 in an axial direction corresponding to a direction for setting an operating condition of the valve, not shown, and in biasing the valve stem biases the abutment means 15 in a direction for causing the complementary threads to bias the adjustment and housing cylindrical element 20 in a direction for causing the ribs 21 to bear on the surfaces 22 thereby tending to hold the actuator means and the cylindrical housing element 20 in axially-assembled relationship. These parts are held in assembled relationship so long as the spring 14 applies tension and without need of further parts for holding the major component parts of the regulator in axially-assembled relationship.

A pin 23 constituting a stop is provided in the housing 20 for limiting the travel of the parts 17 relative to the thread 19 thereby forming a stop limiting angular relative movement in one direction of the housing 20 and the traveling abutment so that the members are not inadvertently disassembled and thus the spring 14 is constantly kept under sufficient compression to hold the parts in assembled relationship as above described. The thread 19 limits angular movement of the "knob" 20 in an opposite direction.

The spaced ribs 21 define therebetween openings 24 and an end part 25 of the cylindrical housing element 20 is provided with a central opening 26 so that air is able to circulate about the actuator element and amply about the actuator housing or casing 8. The casing 8 defines a space between it and the bellows 9 in which a temperature-responsive fluid is housed which develops different vapor pressures in response to the variations of an ambient temperature being sensed. A dividing wall 29 having a central opening as shown is provided internally of the casing 8 defining a space between it and a generally flat wall portion 27 of the casing 8 in which vapor from the fluid is converted to a liquid 28 in response to variable equilibrium conditions caused by sensing of the ambient temperature by the wall surface 27 in the immediate vicinity of the valve regulator. It will be understood, however, that the valve may be also provided with a capillary tube connected to the flange 11 and opening into the space or compartment defined between the casing 8 and the bellows 9 as illustrated. This tube, extending downwardly between the valve body portion 2 and the outer housing, is illustrated fragmentarily. The capillary tube provides connection for a remote temperature sensing device, for example a bulb, not shown. It is to be understood that the present invention is applicable to thermostatic regulators in which the entire control takes place either by sensing temperature in the immediate vicinity or by sensing the ambient temperature by remote means or a combination of both as illustrated in FIG. 1.

The sensing surface or area 27 is provided with an index or reference mark 30 as shown in FIG. 2. The annular bottom or end 25 of the housing 20 is marked which indicia as illustrated constituting a scale 31. The temperature indicia are relatively large numbers as shown. By viewing the valve regulator as shown in FIG. 2 it is apparent that the scale arrangement is parallax-free. The cooperating members permit a very fine and easy adjustment or setting of the temperatures. The entire temperature range is controlled or limited by the stop 23 and a terminal end of the thread 19.

A second embodiment of a regulator according to the invention is illustrated in FIGS. 3–5 inclusive. The regulator of the second embodiment comprises a body portion 33 having an upwardly extending annular part as illustrated and a downwardly extending annular portion 34 for mounting the regulator on a valve body, not shown. The annular part 34 of the body portion of the regulator 33 is provided with a spring-band or clip 35 having pins 36 fixed thereon and received in openings in registry with corresponding recesses in a valve body, not shown, for permanently or semi-permanently mounting the regulator on the valve body.

A fragmentary portion of a valve operating element constituting a valve stem 37 of the valve is received in a recess in an actuating element 39 of actuator means 40 which comprises a casing or enclosure 41 housing a bellows 42 having a free end closed by a closure or cap 43. An inner annular flange 44 is provided in the casing 41 against which the bellows seats in a fluid-tight manner. The housing or casing 41 comprises an internal, annular portion 45 secured to the outer part of the casing by flange means 46. The annular part 45 serves as a limit stop for the contraction of the bellows 42. The casing is provided with an annular extension 47 extending from the flange 46 for mounting the housing on the body portion 33 with angularly spaced screws 48.

The actuator element 39 is secured with a pin or rivet as illustrated to a support plate 49 secured to the closure 43 capable of moving with the free end of the bellows 42. A control spring 50 disposed circumferentially of the stem part 39 is seated on the plate 49 and bears against an abutment 51 disposed circumferentially of the stem 39 and capable of traveling axially thereon relative to the longitudinal axis of the regulator corresponding to the axis of the stem parts 37, 39. The abutment 51 is provided with radial extensions 52 extending through the body portion 33 through apertures as heretofore described with respect to the other embodiment and comprising radial or rim portions 52 provided with an external thread 53 engaging a complementary thread 54 on a cylindrical housing member 55 constituting an outermost control member of the regulator.

The cylindrical control or housing element 55 is provided with radial, axially extending ribs 56 having a shoulder as above described with respect to the first embodiment for engaging an annular end surface 57 of the actuator means housing 41. The actuator means is provided with a temperature-sensing surface 58 on the actuator means housing 41. A space is defined between this sensing surface and an annular partition 60 internally of the casing 41 provided with a central opening providing communication between a smaller space in which a fluid 59 is shown and a larger fluid-containing space defined by the casing 41 and the bellows 42. It being understood, that the larger space contains a temperature-responsive fluid, not shown, that has a variable vapor pressure in response to temperature variations of the ambient temperature being sensed. The smaller space provides a space in which the equilibrium conditions between vapor and liquid are established principally as a function of the ambient temperature being sensed. This operation is similar to the operation with respect to the embodiment illustrated in FIG. 1.

Since the temperature-sensing surface 58 is relatively large relative to the smaller space in which the fluid 59 is held, the liquid is converted either to vapor or returned to liquid thereby varying the vapor pressure internally of the valve for actuating the bellows and thereby acting against the spring principally as a function of the temperature being sensed. It being understood, that in the present invention and in both embodiments of the invention the liquid is shown at the lower part of the smaller compartment since the regulator is assumed to be mounted in a horizontal position as illustrated in the drawing.

The smaller compartment in this and in the other embodiment in which the temperature responsive liquified fluid is contained, has a smaller volume than the compartment containing the bellows, but has sufficient volume to contain all of the liquified fluid even at the lowest operating temperature of the regulator. In this, as in the first described embodiment, a capillary tube illustrated fragmentarily and connected to the annular flange 44 can be connected to the fluid-containing compartment defined between the housing 41 and the bellows as illustrated and to a remote or nearby temperature-sensing bulb.

Means are provided on the regulator for controlling the angular, relative movement of the actuator means and the setting control element 55. A stationary stop is provided on the actuator housing as a protuberance 61. This stop cooperates with stops on the element 55 as hereinafter described. The cylindrical control element 55 constituting the housing of the regulator comprises a tubular body portion 62 and an end or cap member 63 receiving therein a serrated ring 64. The tubular body portion 62 is provided with the internal thread 54 and the angularly spaced ribs 56 defining spaces 65 therebetween through which air circulates as before described. An inner serrated rim 66 is formed on the body portion 62 into which an externally serrated ring portion 67 of the cap member 63 fits. The body portion is provided with an end peripheral marginal edge portion 68 over which a rim 69 on the cap 63 fits when the two parts 62, 63 are in assembled relationship.

The ring 64 fits into the end cap member 63 provided with internal serrations 70 engaging outer serrations 71 of the ring 64. The ring 64 thus is disposed in the plane of the area 72 and is therefore between the projections 73 of the body portion 62 and the annular bottom or end face surface of the cap 63 provided with the opening 76. The whole assembly rotates together. A stop 74 on member 63 and a stop 75 on the ring 64 cooperate with the stationary stop 61 which is sufficiently high to engage either of the two angularly displaceable stops 74, 75.

The stops 74 and 75 can be initially set in any desired relationship by simply assemblying the parts 62, 63 and 64 in desired angular relationships which is possible by virtue of the serrations that cooperate as above described. Thus each of the movable angular stops 74 and 75 function individually with the stationary stop 61 so that a variable range of overall angular travel of relative movement of the member 62 and the traveling abutment 51 is possible thereby limiting the axial travel of the abutment to thus variably set the temperature range of possible settings of the control spring.

A datum or reference mark 77 is provided on the sensing area or surface 58 and a scale 78 is provided on member 63 so that adjustments can be readily read and made by rotating the adjusting means 55. Furthermore, an indicator mark 79 is provided on the cap member 63 to indicate the position of the stop 74 whereby by co-ordination of the marks 78, 79, the end or terminal positions of the rotational "knob" or adjustment 55 is readily set and recognized.

In order to properly, radially position the adjustment members 20 and 25, in both embodiments of the invention, the stationary body portions of the embodiments of the regulator are provided with radial guides for example a single protuberance extending radially therefrom such as the protuberance 80 in FIG. 1 thereby radially positioning the major components, constituting the actuator means and the adjustment means, radially in a set radial position and the parts can be readily radially assembled by virtue of the guides.

While preferred embodiments of the regulator according to the invention have been illustrated and described, it will be understood by those skilled in the art that many changes can be made within the spirit and scope of the invention.

What we claim and desire to secure by Letters Patent is:

1. In an automatic thermostatic valve regulator for automatically thermostatically controlling a valve having an actuable operating element for opening and closing the valve, said regulator comprising, means for mounting said regulator on a valve to be thermostatically controlled, actuator means comprising temperature-responsive means including a temperature-responsive fluid for sensing ambient temperature and responding to variations thereof for actuating said valve operating element in response to said variations of the ambient temperature being sensed, a spring in said actuator means operably connected to said valve operating element in operation for biasing said operating element in a given direction corresponding to an operating condition of said valve, means for setting the value of the force applied by said spring comprising means defining an abutment in said actuator means on which said spring bears, means in said actuator means mounting said abutment movable in a direction axially of a longitudinal axis of said actuator means, said abutment comprising means extending outwardly of said actuator means comprising an external thread, a rotatable cylindrical adjustment element on said regulator for setting operating temperatures and mounted circumferentially of said actuator means and having an internal thread complementary with said external thread for moving said abutment in a direction axially of said longitudinal axis upon rotation of said cylindrical element for variably compressing said spring, said cylindrical element having a transverse portion extending transversely of said actuator means, and said spring being disposed biasing said abutment in a direction axially of said longitudinal axis for biasing said cylindrical element in an axial direction for causing said transverse portion of said cylindrical element to bear on said actuator means to hold said actuator means and said cylindrical element in axially-assembled relationship, a stationary stop on said actuator means, a stop on said cylindrical element for engaging the stop on said actuator and means rotatably driven in conjunction with said cylindrical element having a stop variably positionable angularly relative to said stop on said cylindrical element for jointly with said stationary stop establishing a range of temperatures within which said operating temperature is settable by limiting the angular rotation of said cylindrical element relative to said actuator means and thereby limit the axial travel of said abutment.

2. In an automatic thermostatic valve regulator for automatically thermostatically controlling a valve having an actuable operating element for opening and closing the valve, said regulator comprising, means for mounting said regulator on a valve to be thermostatically controlled, actuator means comprising temperature-responsive means including a temperature-responsive fluid for sensing ambient temperature and responding to variations thereof for actuating said valve operating element in response to said variations of the ambient temperature being sensed, a spring in said actuator means operably connected to said valve operating element in operation for biasing said operating element in a given direction corresponding to an operating condition of said valve, means for setting the value of the force applied by said spring comprising means defining an abutment in said actuator on which said spring bears, means in said actuator mounting said abutment movable in a direction axially of a longitudinal axis of said actuator, said abutment comprising means extending outwardly of said actuator means comprising an external thread, a rotatable cylindrical adjustment element on said regulator for setting operating temperatures and mounted circumferentially of said actuator means and having an internal thread complementary with said external thread for moving said abutment in a direction axially of said longitudinal axis upon rotation of said cylindrical element for variably compressing said spring, said cylindrical element having a transverse portion extending transversely of said actuator means, and said spring being disposed biasing said abutment in a direction axially of said longitudinal axis for biasing said cylindrical element in an axial direction for causing said transverse portion of said cylindrical element to bear on said actuator means to hold said actuator means and said cylindrical element in axially assembled relationship, a stationary stop on said actuator means, a second stop on on said cylindrical element for engaging the stop on said actuator to limit the angular rotation of said cylindrical element relative to said actuator means thereby to limit the axial travel of said abutment, and a ring mountable in said cylindrical element for rotation therewith and mountable in said cylindrical element in different angular positions, said ring comprising a third stop positionable in different angularly spaced positions from said stop on said cylindrical element and disposed for engaging said stationary stop independently of said second stop on said cylindrical element, whereby the angular relative positions of said second and third stops sets a temperature range in which said operating temperature is settable by said cylindrical element.

3. In an automatic thermostatic valve regulator for automatically thermostatically controlling a valve having an actuatable operating element for opening and closing the valve, said regulator comprising, means for mounting said regulator on a valve to be thermostatically controlled, an actuator means comprising temperature-responsive means including a temperature-responsive fluid from sensing ambient temperature and responding to variations thereof for actuating said valve operating element in response to said variations of the ambient temperature being sensed, a spring in said actuator means operably connected to said valve operating element in operation for biasing said operating element in a given direction corresponding to an operating condition of said valve, means for setting the value of the force applied by said spring comprising means defining an abutment in said actuator on which said spring bears, means in said actuator mounting said abutment movable in a direction axially of a longitudinal axis of said actuator, said abutment comprising a plurality of radial arms extending outwardly of said actuator means and comprising an external thread on said arms, a rotatable cylindrical adjustment element on said regulator for operating temperatures and mounted circumferentially of said actuator means and having an internal thread complementary with the external thread on said arms for moving said abutment in a direction axially of said longitudinal axis upon rotation of said cylindrical element for variably compressing said spring, said cylindrical element having a transverse portion extending transversely of said actuator means, and said spring being disposed biasing said abutment in a direction axially of said longitudinal axis for biasing said cylindrical element in an axial direction for causing said transverse portion of said cylindrical element to bear on said actuator means to hold said actuator means and said cylindrical element in axially-assembled relationship, stop means on said actuator means, and on said cylindrical element to limit the angular rotation of said cylindrical element relative to said actuator means thereby to limit the axial travel of said abutment, said stop means including a serrated ring having a stop and variably positioned relative to the stop on said cylindrical element for setting a range of temperatures in which said operating temperature is set.

4. A thermostatic regulator according to claim 3, in which said actuator comprises a stationary fluid-containing casing, said casing having a radial protuberance comprising one of said stop means.

5. A thermostatic regulator according to claim 4, in which said actuator means comprises a bellows internally of said casing, said spring being disposed axially of and internally of said casing and in which said abutment is disposed coaxially with said bellows, and in which said radial arms extend outwardly of said casing.

References Cited by the Examiner
UNITED STATES PATENTS

| | | | |
|---|---|---|---|
| 1,415,584 | 2/1922 | Lawler | 236—42 |
| 1,784,057 | 12/1930 | Giesler | 73—368.7 |
| 1,847,911 | 3/1932 | Trane | 236—42 |
| 1,882,803 | 10/1932 | Giesler | 236—42 |
| 1,920,505 | 8/1933 | Henney et al. | 236—92 |
| 2,160,453 | 5/1939 | Boles | 236—92 |
| 2,215,947 | 9/1940 | Wile | 236—99 |
| 3,071,156 | 1/1963 | Porland et al. | |
| 3,262,642 | 7/1966 | Nielsen et al. | 73—368.7 X |

LOUIS R. PRINCE, *Primary Examiner.*

WM. A. HENRY III, *Assistant Examiner.*